United States Patent
Zembitski

(10) Patent No.: US 6,193,160 B1
(45) Date of Patent: Feb. 27, 2001

(54) INSTALLATION AND METHOD FOR PREPARING ORDER BATCHES BY PICKING PRODUCTS IN A STORAGE AREA AND DEVICE FOR IMPLEMENTING SAME

(76) Inventor: Jury Georges Zembitski, 7, rue du Chancelier Séguier, L'Etang la Ville (FR)

( * ) Notice: Subject to any disclaimer, the term of this patent is extended or adjusted under 35 U.S.C. 154(b) by 0 days.

(21) Appl. No.: 09/133,785

(22) Filed: Aug. 12, 1998

(30) Foreign Application Priority Data

Aug. 13, 1997 (FR) .................................................. 97 10311

(51) Int. Cl.⁷ ...................................................... G06K 7/10
(52) U.S. Cl. .................. 235/472.01; 235/305; 235/383; 235/454; 235/487
(58) Field of Search ............................... 235/385, 472.01, 235/383, 487, 375, 462.01, 470, 454

(56) References Cited

U.S. PATENT DOCUMENTS

| | | | |
|---|---|---|---|
| 4,521,677 | * 6/1985 | Sarwin | 235/385 |
| 4,639,875 | * 1/1987 | Abraham et al. | 364/479 |
| 4,656,591 | 4/1987 | Goldberg | 364/478 |
| 4,748,317 | * 5/1988 | Satoh | 235/462.01 |
| 4,766,297 | 8/1988 | McMillan | 235/455 |
| 4,797,819 | * 1/1989 | Dechirot | 364/403 |
| 5,107,100 | 4/1992 | Shepard et al. | 235/472 |
| 5,214,270 | 5/1993 | Rando | 235/472 |
| 5,274,219 | 12/1993 | Harden et al. | 235/462.01 |
| 5,362,949 | * 11/1994 | Gulick | 235/385 |
| 5,600,565 | * 2/1997 | Wagner et al. | 364/478.07 |
| 5,602,382 | * 2/1997 | Ulvr et al. | 235/494 |
| 5,679,943 | * 10/1997 | Schultz et al. | 235/472.01 |
| 5,767,501 | * 6/1998 | Schmidt et al. | 235/472 |
| 5,844,229 | * 12/1998 | Rockstein et al. | 235/472 |
| 5,869,341 | * 2/1999 | Woodaman | 436/1 |
| 5,900,610 | * 5/1999 | Kelly, Jr. | 235/385 |
| 5,962,834 | * 10/1999 | Markman | 235/385 |

FOREIGN PATENT DOCUMENTS 0156953  10/1995 (EP) .

* cited by examiner

*Primary Examiner*—Thien M. Le
*Assistant Examiner*—Daniel S. Felten
(74) *Attorney, Agent, or Firm*—Fulbright & Jawoski, LLP

(57) ABSTRACT

A parcel (4) installation for preparing purchase orders comprising at least an optical reading device (5) for reading bar codes. The parcels (4) are put together from products distributed in storage sectors and identified by bar codes. The device includes switches (57a, 57b) for obtaining a first, so called gun, reading mode allowing reading bar codes identifying the parcel (4) and a second, so called hand-free, reading mode for reading bar codes born by the products passing in front of the reader (53) while with the device operates in the second reading mode. Preferably, the device also includes an affixed or movable screen (52) for displaying the data read and guiding the operator.

3 Claims, 4 Drawing Sheets

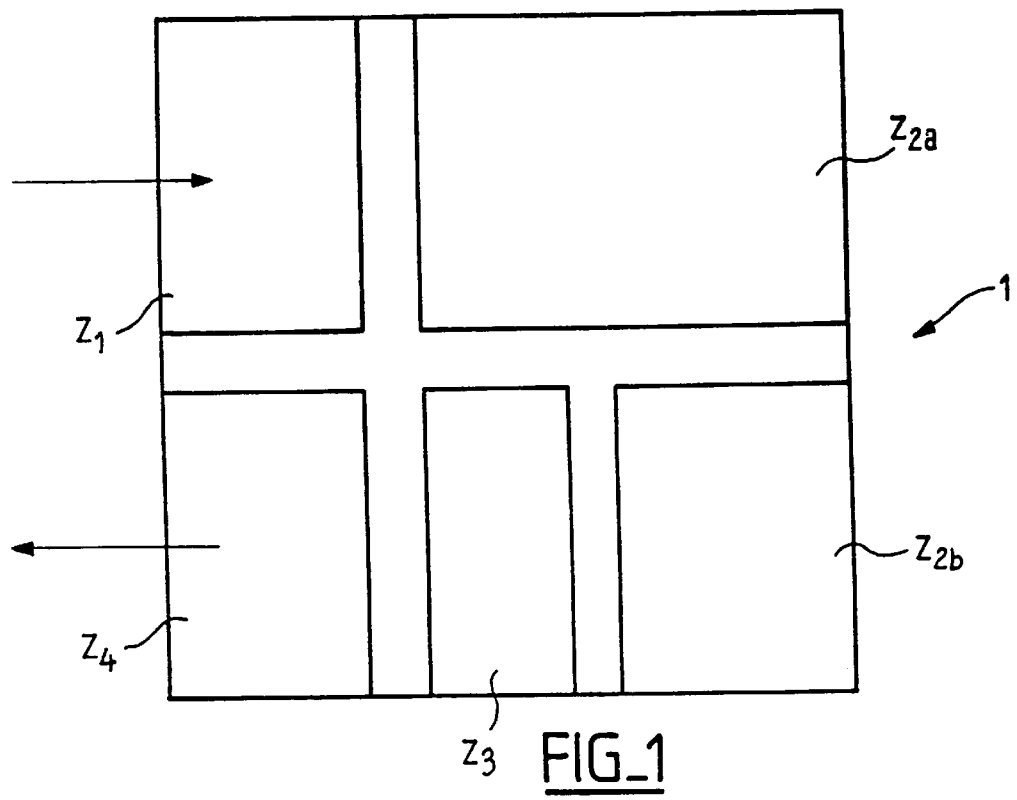
FIG_1
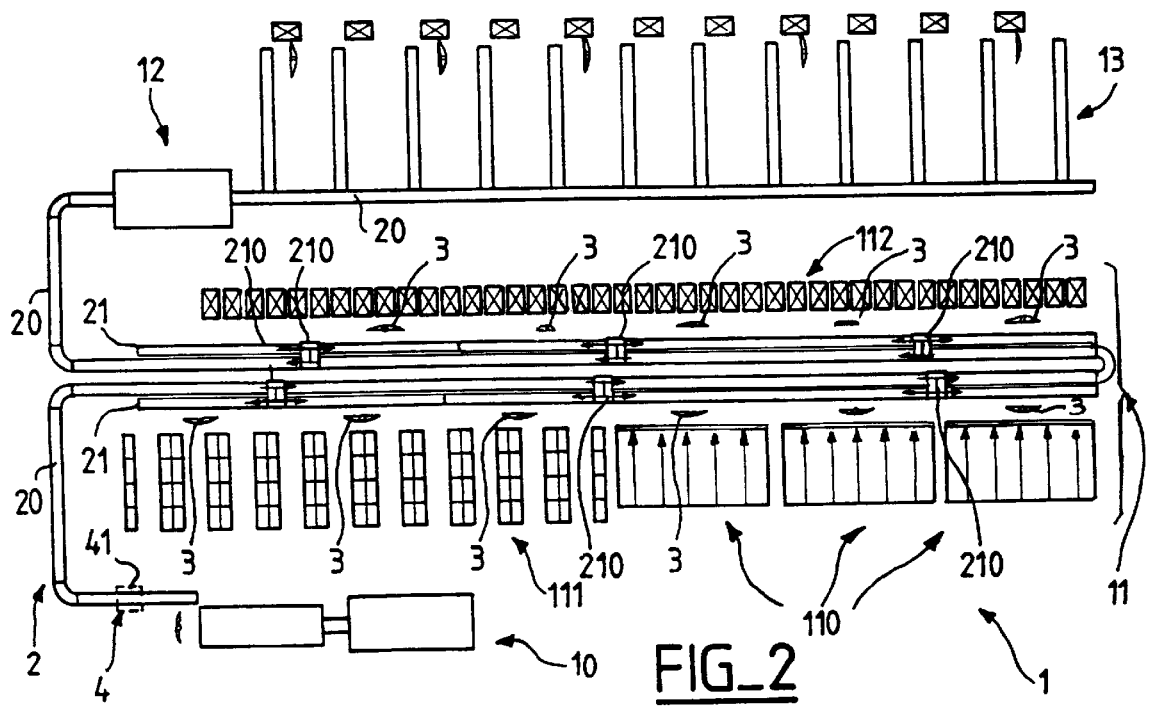
FIG_2

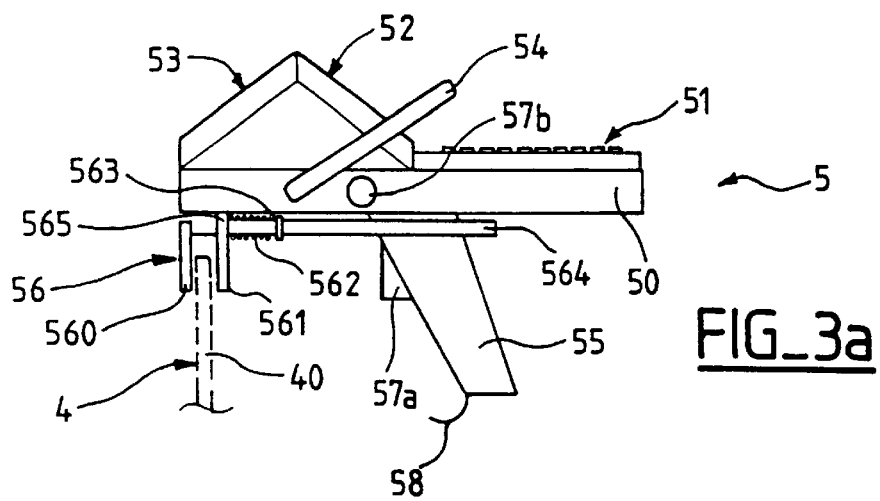
FIG_3a
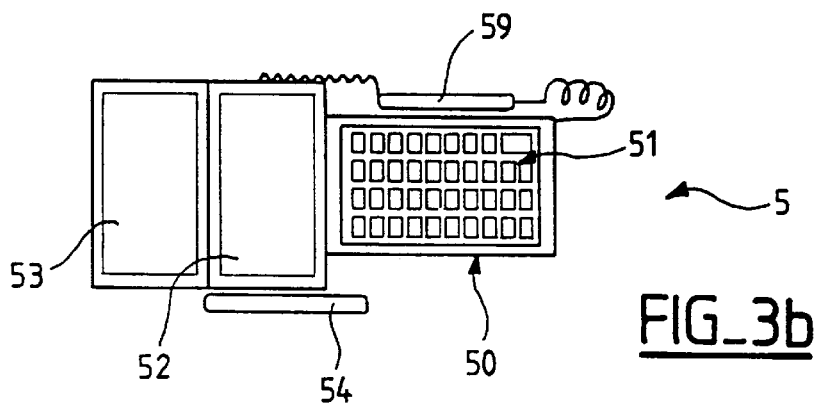
FIG_3b
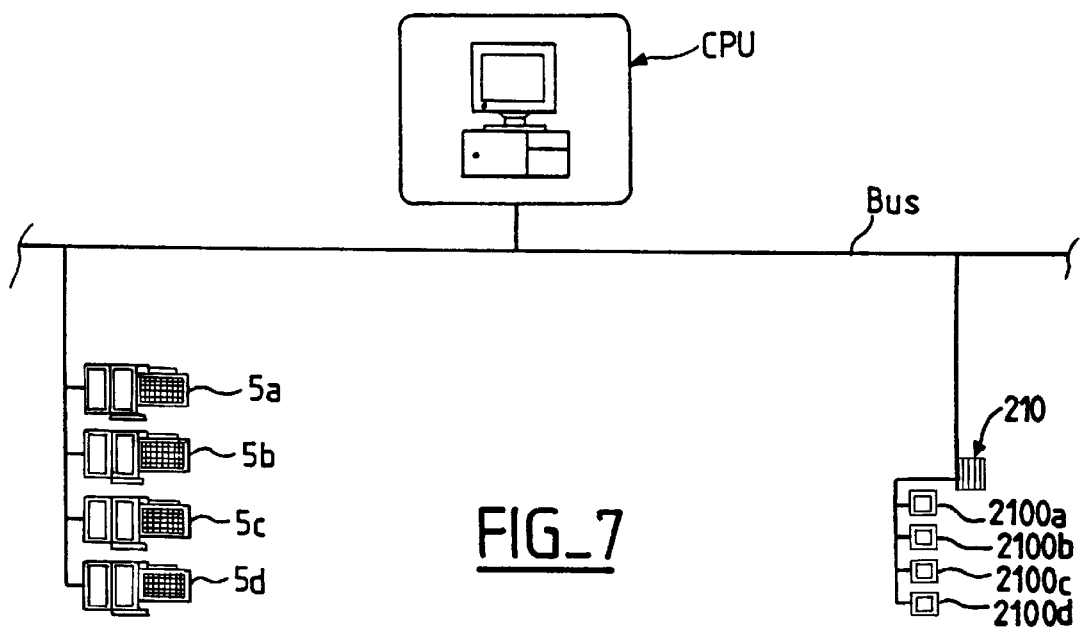
FIG_7

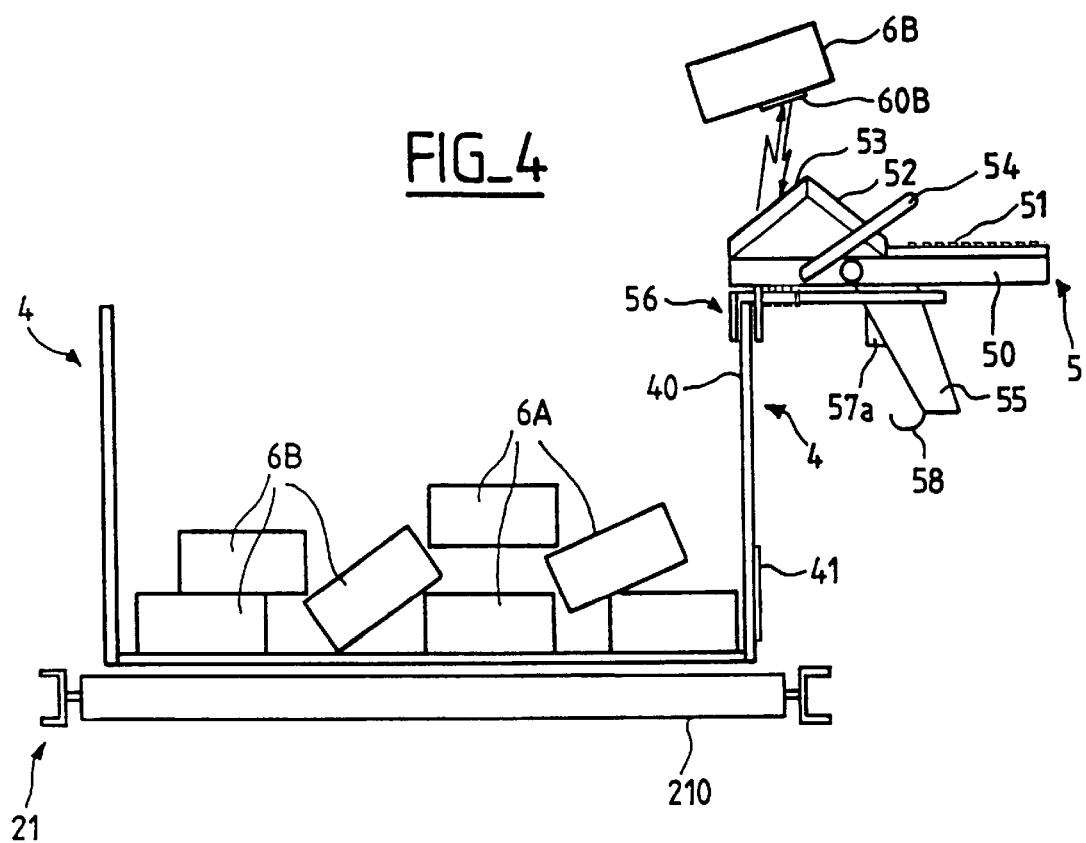
FIG_4
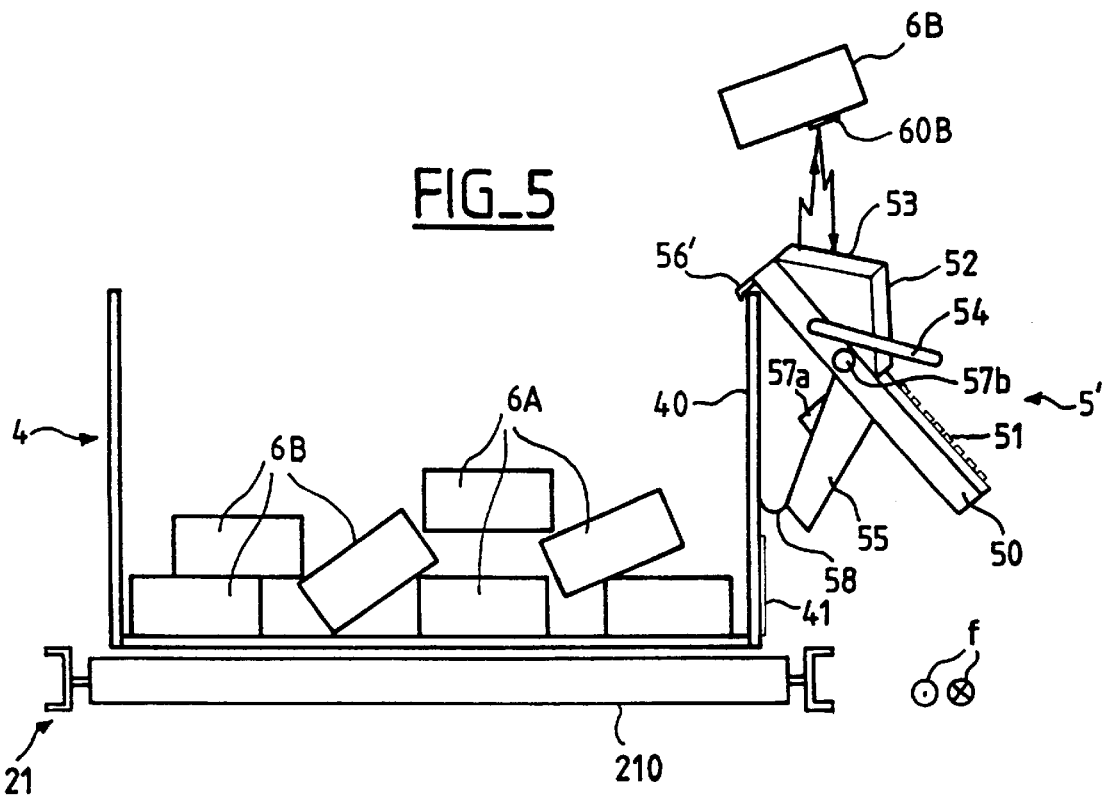
FIG_5

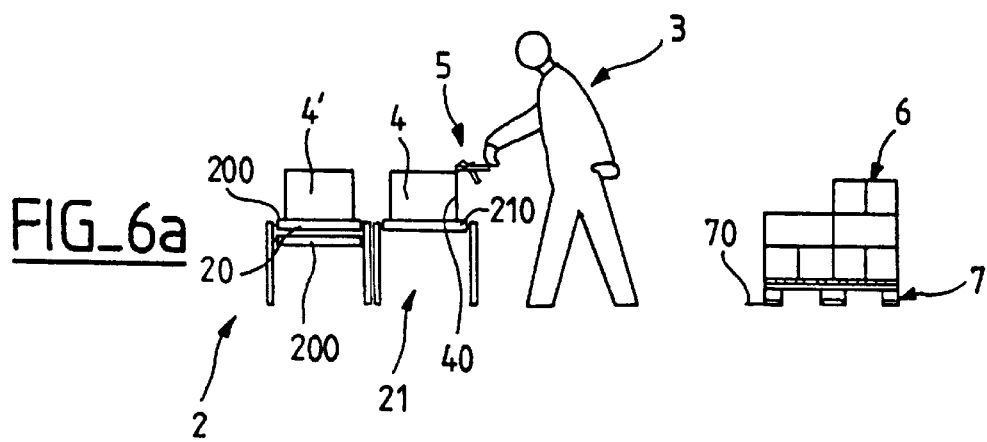
FIG_6a
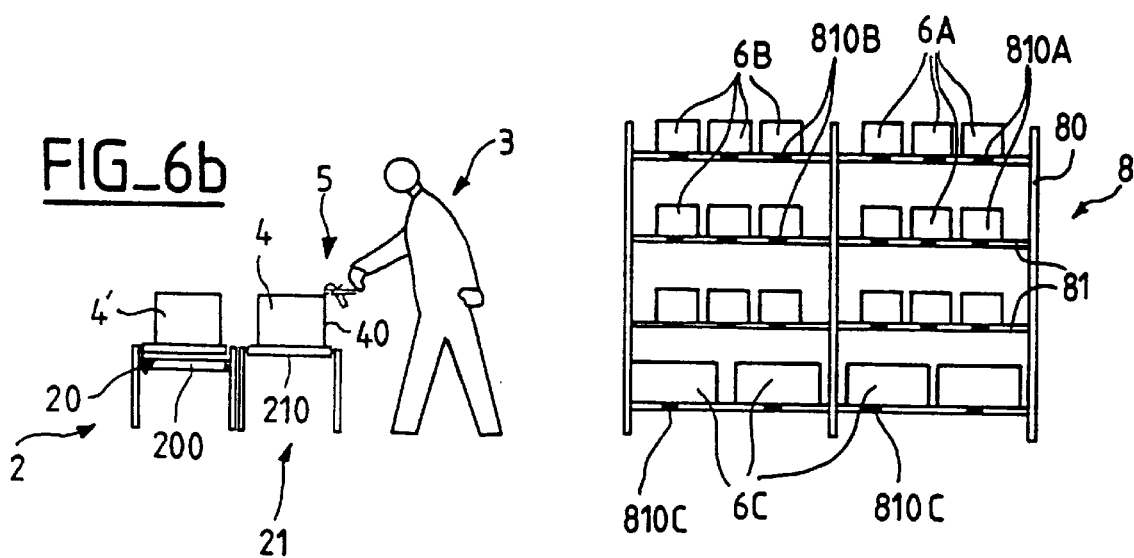
FIG_6b
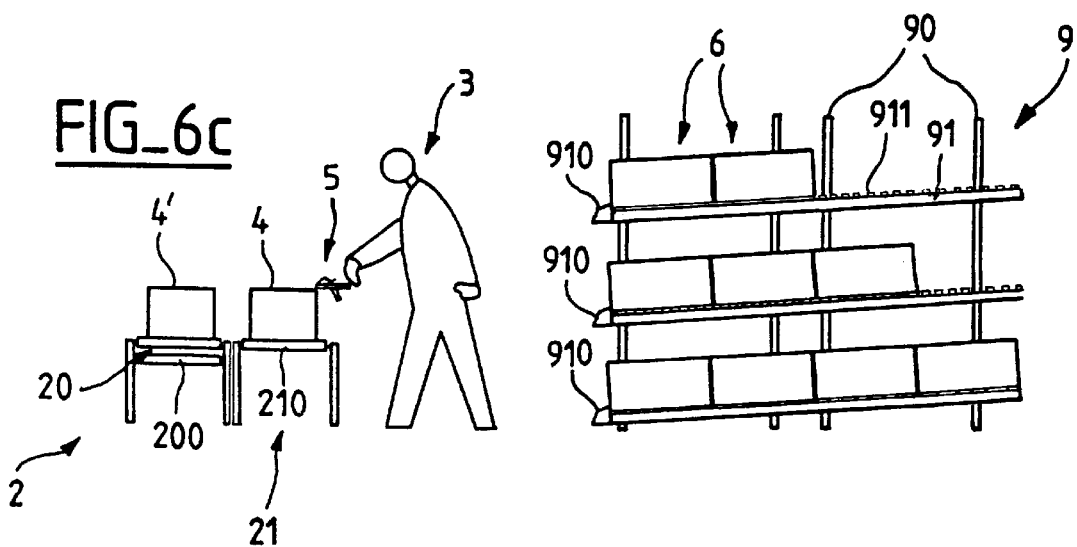
FIG_6c

INSTALLATION AND METHOD FOR PREPARING ORDER BATCHES BY PICKING PRODUCTS IN A STORAGE AREA AND DEVICE FOR IMPLEMENTING SAME

The present invention relates to an installation for preparing orders by picking products from a storage area, such as the installations being used in the food products industry for loading parcels according to orders to be met, and for delivering independently into each parcel. It particularly is related to an installation comprising at least a portable electronic device, of the bar code reader type or similar, to be used for realizing and checking the product picking according to the orders.

The invention also is related to a method for putting together a parcel in said installation, as well as a device for reading and processing information, available as optical indicia, intended in particular for such an installation.

Within the scope of this invention, the term "bar codes" should be understood in its broad sense. It in particular includes conventional linear bar codes (code 39, code 128, code I 2/5, code EAN13, and so on), but also the so called bidimensional or matricial codes (code "one", code PDF 417, code "Datamatrix", and so on), and in a more general way, any optical readable signs, including alphanumeric characters.

Similarly, the term "products" indifferently includes all types of goods, objects or various pieces. For purpose of simplification, such a product will hereinbelow be termed an item, without this limiting in any way the scope of the invention.

BACKGROUND OF THE INVENTION

Code reading is effected in a conventional manner by scanning with the help of a semiconductor laser or similar techniques. Optoelectronic devices (photodiodes, charge coupling devices or CCD, etc.) convert the information which they read, and which appears under the shape of light intensity variations, into electronic signals which are stored and are utilized in situ, or still transmitted to a remote central computer system. Generally, the reading instrument includes a display member such as a liquid crystal display, a keyboard for entering data or programming instructions, as well as information processing and data storage circuitry.

The most recent bar code reading apparatuses are built around a microcomputer architecture; they can be coupled to a central computer system in various ways: hertz waves, wired link, modem, optical (infrared) channel, and so on. They can record a large number of data, which data can concern both information being read from these bar codes and various pre-recorded information and/or instructions.

Apparatus of this type is in particular used for preparing parcels according to a customer order, by loading those products, to be delivered, which are available in a storage installation provided for various items. Within the scope of the invention, the expression "storage installation" relates to any type of warehouse for logistically distributing various products, items, goods, pieces or objects.

As schematically illustrated in FIG. 1, appended to the present description, a distribution warehouse 1, when it is complex, includes several distinct areas, for instance the following areas:

a reception area Z1 intended for unloading vehicles, checking the received goods, identifying products and grouping same in storage areas. Those areas can vary according to the nature of the products being considered (pallets, bins, bags, and so on)., one or more, for instance two, so called mass storage areas, Z2a and Z2b, as illustrated in FIG. 1, which are intended for keeping products in as small a volume as possible. When several storage areas exist, the products distribution between them may for instance be effected by taking into account their packaging or storage mode (pallets, cases, shelves, and so on), an order preparing and packing area Z3, which is more directly related to the invention. In this area is effected the so-called "picking" towards a parcel, which can be an intermediate container or directly a cardbox or a crate to be shipped for delivery. Some sorting of initially picked items possibly is executed. Checking the picked items, and closing and labelling the prepared parcels, also are effected in this area Z3, and a parcel sorting and grouping area Z4, in which said prepared parcels are sorted and grouped according to various parameters such as consignee addresses, carrier addresses, and so on. Finally, the last operation in this area consists of loading such filled parcels into said carrier vehicles.

Within the scope of this invention, the notion of parcel should be understood in its broadest sense and the same is true for the notion of container. The latter might be a simple bin which the items corresponding to the batch of customer ordered items are temporarily put into, or a cardboard which will be closed when filled with such a batch, or still a cardboard in a bin.

As regards more particularly the order preparation area Z3, it should be noted that the latter can be included with the storage area or areas Z2a and Z2b, also called picking areas, wherein the picking is effected from cases or other storage containers by means of stackers which allow the operators to pick up items, pieces or other products located in elevated positions. It also, while being included in these Z2a and Z2b, may be located on the lower levels, allowing an easier access to the items to be picked. It still, as a specific preparation area Z4, can be separated from the storage area, as illustrated in FIG. 1.

Otherwise, the prior art provides many order preparation methods. The exemplary, although non exhaustive, following methods which are the most popular can be quoted:

a picking round being effected with a check list, to be checked off or, in other words, discharged each time a product has been picked and put into the container for preparing an ordered batch;

a picking round being effected with labels and implying adhering said label on the corresponding picked product;

a picking round being directly effected by loading into the batch shipping cardbox, with several lists to be checked off in the case of several parcels per round, one of said lists giving item locations while the others indicate the items for each parcel.

These methods and systems however suffer from the inconvenience of needing many hand operations.

Many attempts certainly were made for mechanizing and automating the picking operations. These attempts however only were successful in very specific economic sectors. Let us mention here the automated distributors for pharmaceutical product distribution.

Mechanizing only in a partial manner also was devised: preparation systems on conveyors with automatic item sorting, or preparation systems with multiple branches, also called order preparation systems with sectors (or with stations).

In these systems, the parcel (cardboard, bin or other, possibly intermediate, container) is carried over to the picking area, wherein products bearing the predetermined references should be picked for parcel filling. As an example, let us consider a system including a plurality of sectors, numbered 1, 2, 3, . . . Suppose that the order comprises several items, but that these items only concern two distinct references, arbitrary labelled A and B. Let us also suppose that the items referenced as "A" are located in sector #2 and the items referenced as "B" in sector #3.

Under these conditions, a parcel to be prepared, which was built up upstream of the system, is carried by a motorized conveyor, and is branched off by a shifting member towards sector #2 without passing through sector #1. This branching is made possible by an identification label (or a similar member) placed on the parcel at initiation time. This label is automatically read at each sector entrance and a shifting member associated with the sector only is actuated if an item stored in this sector should be loaded into the parcel constituting the receiving container.

Generally, the label is provided with bar codes, but other equivalent container codification means also exist (such as for instance a honeycomb reflector, a transponder, an electronic label, and so on).

Once the items available in the sector #2 have been placed into the receiving container for the order being prepared, the operator pushes back such container onto the carrying conveyor, so that it will be directed towards, and enter, the sector #3, and the items with referenced as B will be placed into it. After this loading is completed, the container is pushed back onto the conveyor to be conveyed towards the conveyor line end, without stopping in any other sector since those contain items with references other than A or B.

Although an at least partial operation automation is obtained, the system with many shifting members however suffers from various inconveniences, due to its intrinsic operating mode. Namely, the container transfer, both when branching from the main conveyor towards the sectors and when reverting towards the main conveyor, necessarily is random since the exact batch to be received into each and every container depends upon a given customer's order. Generally, the items related to a particular order are not equally distributed among the various storage sectors. This results in, either unproductive operator waiting times in one or several sectors, or queues of containers to be filled which can exceed the processing ability of one or several sectors, with a possibility of causing, in the worst case, a complete blocking of the installation.

Furthermore, the order preparation uses, either a checklist being associated with a container and pulled out by the operator each time a container branches towards a determined sector, or displays (for instance light emitting screens) being placed on the picking locations in the preparation area and requiring checking off.

In both cases, the prior art suffers from many inconveniences. The checklist must be hand pulled from the container or batch preparation parcel and put back into it. The displays forbid a presence of several operators in a same sector. Finally, these methods do not avoid errors and consequently do not guarantee a large degree of reliability.

SUMMARY OF THE INVENTION

The object of the invention consequently consists of avoiding the prior art inconveniences, some of which just were reminded. It particular aims at insuring both a larger degree of automation and an increased reliability, close to the "zero defect". Also, for systems with multiple branches, it allows a presence of several operators in a same sector, which authorizes unjamming loaded sectors and generally avoids any total system blocking. In a more general way, the invention leads to an increased productivity, because of the above mentioned advantages, but also because the time, which an operator of the invention needs for processing, generally is shorter than the one he needs when employing a checklist or other displays, which require manually checking off.

The invention essentially consists of providing a device for reading and processing information available as optically readable coded indicia, such as bar codes to be read by an optical reader while both each container in an order batch preparation installation and items to be used as filling contents for said container are scanned, with means allowing it to alternately be operative for reading two different optical indicia series respectively pertaining to container information and to contents information, as well as with a switching means to automatically switch from a first said reading mode wherein it is operative for reading and decoding said container information under the shape of a portable apparatus to be manipulated by an operator, in particular for their treatment in elaborating information to be displayed in front of said operator, to a second reading mode wherein it is operative for reading and decoding said contents information, in particular for processing by comparison with information displayed on a screen in front of said operator. Preferably, such a device according to the invention further includes means for automatically controlling said switching means according to whether or not said apparatus is present on a fixation support, in a temporary state where it is not portable.

The invention consequently in particular provides a device for reading and processing optical indicia in at least two reading modes, respectively reserved for two different natures of indicia to be read. Depending upon whether the reading and decoding apparatus is used in a classical manner as a portable gun for scanning relatively fixed indicia, or whether it is used hand-free when the portable apparatus is affixed on it support, for instance on a container to be filled in an order batch preparation installation, it automatically switches from a phase for processing information of a first nature reserved for container information when the operator manipulates the apparatus for reading indicia such as the bar codes identifying a container and characteristics associated therewith in such an installation, to a phase for processing information of a second nature, reserved for contents information, such as the one which the operator can insure the reading of when he or she introduces an item into the container, by having coded indicia born by the latter passing in front of the optical scanning member of the apparatus, once the latter has been put in its temporarily affixed state, on its support.

It should be noted that the simultaneous changeover of both the reading mode (gun/hand-free) and the reading nature (container/contents) is quite natural for the operator, when the switching is automatically insured at the time when the support receives the apparatus since, since he or she will during the second operating phase be relieved of the inconvenience and fatigue that would result from his or her having to move both the reading apparatus and the items to be picked for filling the container. Furthermore, it is advantageous to provide the portable reading apparatus with co-operating means for an associated support directly constituted by or on said container (such as an order batch delivery cardboard) since it allows dispensing with other classical indicia by which the operator signals which container is being filled.

This embodiment of the invention with two reading modes respectively reserved for two natures of coded indicia, with the help of a switching controlled from the temporary support, is not limiting. Hand switch control means can in particular be provided, for instance by depressing a specific button, or keys on a keyboard provided for the reading apparatus.

According to the preferred embodiment of the invention, this type of disposition allows an additional switching to alternately use the reading apparatus, either for reading container information (the processing of which in particular determines the displaying of types and quantities of items to be introduced into this container), or for reading contents information by having the carried items to pass in front of the reader affixedly located on its support (the processing of which in particular determines the monitoring of the reference of each item picked for loading into the container and increments or decrements a counter or similar member), or for defining and/or reading information relating to storage areas or locations, from which the various items intended for the container should be picked. The presence of a keyboard also allows the operator to capture data and/or instructions, for instance a quantitative indication for items belonging to a same category or located at the same determined storage location.

According to other characteristics of the device for reading and treating information shaped as optical indicia according to the invention, the portable reading apparatus advantageously is provided with a display screen, which is controlled for displaying information resulting from a processing in which at least the container information acts, and which is separable from the scanning reading device when the reader is operative for reading optical indicia concerning contents information. In practice, two screens can also be forecast. In other words, the reading apparatus in this case is provided with viewing means for information decoded by adding, to a classical reading apparatus already having an affixed display screen, both a removable screen and electronic circuitry insuring that the information appearing on the affixed screen is duplicated on the removable screen. This information may for example result from processing contents information previously collected and/or from a comparative processing based on information acquired by reading the proper coded marks of the items brought by the operator for filling said container.

According to a further embodiment of the invention, the screen or display member advantageously provided for the optical reader is detachable from the body of the latter and includes an affixing means which for instance allows it being carried on the operator's wrist. It then advantageously includes communication means with the device body, for instance by radioelectric transmission. In particular when the viewing means includes two display screens, this allows the operator reading the information either directly on the own screen of the reader (the so-called affixed screen), or on the second screen (removable screen which is carried round and on which the information appearing on the first screen, as the result of reading container information, is duplicated).

According to one of its implementations, the object of the invention is an installation designed for putting together order batches, wherein each batch includes at least one contents item to be placed into a container by being picked in a storage area, characterized in that it comprises at least one portable optical reading device comprising, at least, a member for reading and decoding optical indicia, a first switching means triggering a first reading mode wherein said device is operative for reading a first optical indicia series associated with said container, means for obtaining a temporary fixation state of said device on a support, consisting of or close to a container, and a second switching means for triggering, when said device is in said temporary fixation state, a second, so called hand-free, reading mode wherein said device is operative for reading a second optical indicia series associated with said items, by having said items passing in front of said member for reading and decoding optical indicia, and by introducing same items into said container.

Another object of the invention is a method for putting together parcels, characterized by successive steps in which the various means included in the installation as defined above are operated.

BRIEF DESCRIPTION OF THE DRAWINGS

The invention will be better understood and other characteristics and advantages thereof will appear upon reading the following description, referring to the appended figures, wherein:

FIG. 1 schematically illustrates an examplary layout for the logistic functions in an installation constituting a prior art item storage warehouse;

FIG. 2 schematically illustrates an order preparation system according to the invention, in a so-called sector or station type installation;

FIGS. 3a and 3b respectively illustrate in a side view and a top view an examplary reading device to be used in an installation according to a first embodiment of the invention;

FIG. 4 illustrates in a more detailed manner the operation of this reading device when used in the hand-free reading mode, in the case of a first hanging mode of the device;

FIG. 5 illustrates a alternative embodiment of the reading device, also when used in a free hand reading mode according to the invention, adapted to an another hanging mode;

FIGS. 6a to 6c illustrate in a more detailed manner examplary storage sectors being part of a warehouse, according to three different structures; and FIG. 7 illustrates an examplary computer system architecture wherein interactive links are operated between several reading devices of the invention.

DETAILED DESCRIPTION OF THE INVENTION

In order to clarify the invention, the latter will first be described within the frame of an order preparation system with sectors or stations. An examplary warehouse 1 provided with such a system is schematically illustrated in FIG. 2.

Containers (bins, cardboards or cardboards in bins), intended for receiving the order items constituting the batches in the various parcels, are formed and launched in a first area 10, located upstream of the installation. The containers at this stage are empty. They for example consist of cardboards or similar packings, or intermediate containers. They are directly placed onto a conveyor 2, with the whole being globally designed by the reference 4. The conveyor includes a main transport path or main conveyor 20, meandering through all areas in the warehouse 1.

The bar code bearing labels 41 are placed on the containers in the forming and launching area 10. The information associated with these bar codes identifies the container 4 to be filled and the items to be placed therein (references, sector number, possibly storage location inside a determined sector, quantity, and so on).

The order preparation areas are globally represented by the reference 11. In a more precise manner, three types of sectors served by conveyor 2 exist in the example shown on FIG. 2: storage sectors with products in cases 111, storage with dynamic back type picking 110 (storage in the back of operators 3) and sectors with pallets 112. Examplary embodiments of such sectors will be detailed hereinbelow. The installation also advantageously includes sectors with dynamic front type picking (not shown), wherein the items to be picked are disposed in storage areas located in front of the operators, above the conveyor.

In a manner well known per se, the main path 20 of the conveyor 2 includes a certain number of shifting stations 210, each of which is represented as serving two, symmetrically disposed, previously defined sectors. They possibly may serve only a part of one or two sectors of this type. It namely should be noted that each sector can be served by several shifting members, which insure a branched conveying from the main path.

In a well known manner as well, these shifting stations 210 are provided with fixed readers (not shown on FIG. 2), allowing decoding all or part of the information born by the bar codes of the above quoted labels, in particular the sector or sub-sector numbers if several shifting stations 210 are associated with a same sector. In the example illustrated in FIG. 2, three shifting stations 210 serve six sectors with pallets 112.

When one of the shifting stations 210 reads a coded address associated therewith, on a container 4 carried on the main path 20 of the conveyor 2 (sector or sub-sector number), a deflector member (not shown since known per se for its mechanical realization) is actuated, and the container is branched off towards an auxiliary path 21 of conveyor 2, having a parallel relationship with the main path 20. This auxiliary path 21 advantageously consists of freely rotating rollers, so that the branched off container 4 indifferently can be translated in the forward direction of conveyor 2 or in the opposite direction. It then is received by an operator 3.

According to one of the characteristics of the invention, the operators 3 are provided with a specific bar code reading device. The FIGS. 3a and 3b illustrate a side view and a top view of an exemplary embodiment of a bar code reader 5.

In an otherwise conventional manner per se, the reader 5 includes a main body made of a housing 50 enclosing electronic circuitry and/or information processing circuitry with a pre-recorded program. It further includes a scanning member 53, producing a laser beam or similar beam which is read by optoelectronic conversion members (not shown). This scanning member 53 is what allows reading the bar codes born by the label affixed on the container 4 (FIG. 2). A screen 52, for instance a liquid crystal display, allows displaying the data, whether read by the scanning member 53 or pre-recorded in the reading device 5. A keyboard 51 advantageously is provided, allowing sensing data and/or instructions which also can be displayed on the screen 52. The device 5 usually includes a gripping member 55, of a crosshead type, which allows an operator to easily hold it manually.

A first switch 57a, advantageously located inside the crosshead 55, allows triggering a classical type reading, i.e. a gun reading. For this purpose, the operator 3 (FIG. 2) brings the scanning member close to the bar code bearing label 41 and depresses the switch 57a. The device 5 then reads the bar code, and the internal electronic circuitry decodes the information associated therewith, in particular the identity of the container 4, the references of the items to be loaded, the quantity of items for each reference, and possibly the location of the latter in the storage area(s) which the operator 3 assigned to this sector can access to. Once this information has been decoded, it is displayed on screen 52 for the operator under a readable shape.

The operator 3 temporarily affixes the optical reading device 5 on the container 4 being filled. For this purpose, according to a secondary feature of the invention, the housing 50 of the device 5 is provided with a hooking member 56, which constitutes its temporary affixing support.

According to a first embodiment, as represented in FIG. 3a, this hooking member 56 is shaped as a clamp with an axis 564, a first jaw 560 being perpendicular and unitary with said axis 564, and a second jaw 561 with on orifice 565 in which the axis 564 is introduced, an abutment 563 disposed on the axis 564, and a spring 562 arranged between the abutment 563 and the second jaw 561. When the operator 3 depresses the axis 564, both jaws 560 and 561 spread apart and the spring 562 is compressed. The upper end 40 of a container 4 can be introduced between both jaws 560 and 561. When the operator relieves his or her depressing action on the axis 564, both jaws 560 and 561 are brought near to one another again by the action of spring 562 being relieved, and they trap the wall 40.

According to another feature of the invention, the device 5 includes a second switch 57b. When the device 5 is affixed on the wall 40, the operator depresses the switch 57b. This action triggers a second, so-called hand-free, reading mode. In order to check the contents of the parcel being prepared in accordance with the corresponding orders, the operator then only needs to have those items which must be placed into the container 4 to pass in the viewing field of the scanning member 53. For this purpose, the operator 3 looks up the screen 52, which will indicate him or her the quantity of items to be placed into the container 4, their references and/or their locations inside the area which he or she serves.

Advantageously, if several item types, (i.e. items with distinct references) are stored in the same sector, the associated information (quantity, code or reference, location) is displayed on distinct lines on the screen 52 to avoid any ambiguity.

In the hand-free mode, the reading device 5 reads, via the scanning member 53, a label adhered on the item and bearing the optically readable codes, which herein are bar codes identifying the item. The information translated in this bar code includes at least its reference. If the reference being read does correspond with one of the references of ordered items, as displayed on the screen 52, the device 5 can output a light signal and/or preferably a sound signal, for instance a characteristic beep, indicating to the operator 3 that the manipulation he or she just executed is correct. Simultaneously, the quantity displayed on the corresponding line is decremented by one unit.

Advantageously, when all items corresponding to a given reference have been placed into the container 4, the line associated with this item is cleared from the screen 52. The operator 3 then knows that he or she has finished up loading the items having that reference.

All those operations are made under the control of electronic data processing, microprocessor based for instance, circuitry which is conventional per se.

If such is not the case, if the item just placed into the container 4 does not correspond to at least one of the references of items to be loaded, or if the number of items for that product is excessive, a light or sound signal, distinct from the first one, also is output. The operator 3 then knows that he or she made a mistake and should remove the item he or she just placed into the container 4. The operation is not taken into account, in that the displayed item reference is not decremented by one unit.

As an alternative implementation of the invention, when the number of the items is large, the operator may have a choice between, either repeatedly passing the items in front of the scanning member 53 according to the just described procedure, or entering with the help of the keyboard 51 a number representing the quantity of items of the same reference to be placed into the container 4.

According to a preferred alternative of the just described first embodiment of the invention, the very fact of affixing the device 5 on the wall 40 induces an automatic triggering of the second reading mode, i.e. the so called hand-free mode. For this purpose, the hooking member 56 of the temporary affixing support only needs being coupled with the second switch 57b, for instance by means of an articulated finger (not shown). In this case, the device is designed so that merely pushing the axis 564 automatically triggers the shifting into the second reading mode. In this embodiment, the switch 57b may in fact be omitted or, more precisely stated, be inaccessible from the outside of the housing. Also, in this embodiment, the switch 57b may be used for triggering a third reading mode (for a product batch number or for a location or area reference).

Advantageously also, a hook 58 or a similar member may as well be made unitary with the bottom of the crosshead 55 or any other appropriate location on the housing 50. This member 58 allows hooking the device 5 on the belt or any other piece of clothing of the operator 3. This arrangement is particularly interesting when the operator 3 has to perform sizeable movements within his or her sector. This for example is the case in sectors including storage cases or shelves with static picking.

Optionally, the device 5 may include an auxiliary optical gun for optically reading bar codes 59, in addition to the main scanning member 53.

Finally, the device 5 may operate in an autonomous way, or, in a preferred embodiment, be linked with a central computer system. The progress of technology has allowed substantial increases of the information processing circuitry reckoning power, while reducing the volume occupied by such circuitry, and also providing it with a large RAM capacity. It thus is possible, as indicated above, to integrate the equivalent of a microcomputer within the housing of the device 5. A large part of the information processing may thus be performed within the optical reading device itself. Similarly, the major part of the data necessary for this information processing can be pre-recorded.

A real time follow up of the various parcel preparation operations may however be interesting. For this purpose, the various devices 5 are linked with a central computer system by any appropriate technique: wired link, modem, hertzian link, magnetic loop or optical (infrared) link. In the example illustrated in FIGS. 3a and 3b, an antenna 54, made up of a single cord was provided. The links can be unidirectional or, preferably, bi-directional.

In a first transmission direction, the data read by the device 5, either in the gun mode (first reading mode), or in the hand-free mode (second reading mode) can be used for different purposes, for instance locating the items batches being put together, checking the order progression status and the inventory status, and so on.

In the second transmission direction, the devices 5 may receive data and/or instructions to be loaded into their memory. This may for instance consist of tables elaborating the correspondence between the codes being read on the labels affixed to the containers 4 and their full wordings, as displayed on the screen 52.

By using a bi-directional communication, it also is possible to prohibit any other operator 3 from filling a container 4 with items already present in such a container in a quantity sufficient for each item reference. Since the container identity data are transmitted to the central computer in this case, if this new operator attempts filling again the container 4, an error message is transmitted to the device 5 which it is provided with. The device 5 will then output a light or sound error signal. The container 4 then does not need any manual marking, which practically avoids any risk of erroneous handling.

In an accessory manner, the links also allow mutually exchanging messages between the operators 3 and a central station, for instance for signalling an abnormal situation or various problems (inventory shortages, damages upon picking some items, and so on). An operator 3 may in particular use in a combined manner the reading function, to acquire bar codes, and the keyboard, to associate a comment therewith and forward this information to a central station or the global computer system.

After all stored items to be picked in a given sector have been placed in the container 4, the operator unhooks the device 5. This manipulation causes an automatic switching into the gun reading mode if, as is the case in the preferred embodiment, the hooking member is coupled to the second switch 57b or to an internal switch exerting this function inside the housing. Otherwise, it might be necessary to depress the second switch 57b. In an other alternative, this switching may be automatically obtained by the electronic housing circuitry or by software, or may be controlled only when ordered items to be picked in the sector have correctly been placed into the container 4, so as to meet the corresponding customer's order.

After all items stored in a given sector have thus been picked for filling the container 4, the latter is pushed towards the main path 20 of the motored conveyor 2, which will carry it to another sector. The above described operations are implemented in an identical manner for those concerned sectors until the container 4 reaches a parcel closing station 12 and a parcel sorting system 13. The operations implemented in those areas are completely conventional and need no further description.

The FIG. 4 illustrates in a more detailed manner the filling of the container 4 during the hand-free mode reading phase. At this time, the device 5 has temporary been affixed to the wall 40 of the container 4. The latter may be moved in either direction on the rollers 210 of the auxiliary path 21 of the conveyor 2 (FIG. 2). The container 4 bears a bar code identification label 4 which is decoded during the gun reading phase (first reading mode). Passing an item, herein referenced as 6B, in front of the window of the scanning member 53 is detected by the device 5, which triggers the various, just described steps (decrementation, possible information transmission to the central computer system, and so on).

This item 6B namely bears a label with bar codes 60B which is read by the scanning member 56. Those bar codes in fact most frequently are directly printed on a face of the item 6B. In the example illustrated in the FIG. 4, the container 4 already contains four items of another reference 6A and three items of the currently being loaded reference 6B.

The FIG. 5 illustrates a second embodiment, herein referenced as 5', of the double reading device. The latter is identical to the device 5 of the FIGS. 3a, 3b and 4, with the exception of the temporary hooking member to wall 40. This member, referenced as 56' herein consists of a simple, hook shaped lug. The device 5' can be placed against this wall 40; it is then held at this upper end of the latter by the hook shaped lug 56' and bears against the wall with the lower end of the crosshead 55, or with the transportation hook 58 if any. As previously, the device 5 includes two switches 57a and 57b, respectively assigned to triggering a particular one of both reading modes (gun or hand-free).

As previously, the temporary hooking member 56' can, in the preferred embodiment alternative, act as switch 57b or as an internal switch exerting such function, so as to cause the automatic switching from one reading mode into the other.

Whatever the embodiment (FIG. 3a: 56 or FIG. 5: 56') of the temporary affixing member is, the optical reading device 5 or 5' can be hooked onto a wall of the container 4 itself, as supposed up to now, or onto a fixed support, adjacent to the container, or at least close to it. It namely is necessary for those items introduced into the container 4 to pass within the scanning member bar code reading field to supply the contents information, through decoding.

Similarly, whichever the embodiment of the optical reading device 5 or 5' is, the electric power supply will preferably be effected by rechargeable batteries. In the present state of the art, batteries used for such devices typically are limited to an autonomy or up to one or two hours.

It thus is important to adopt measures allowing a sensibly longer autonomous operation.

According to a first alternative embodiment, the optical reading device 5 or 5' is provided with one or more photo-electric cells (not shown) which detect the passing of an item within the reading field and only activate the scanning members when this detection is effective. For the remaining time, only the electric power circuitry of the electric photocells, of the associated detection circuitry and of the control circuitry for the other circuitry power supply are activated. The required electric power consequently is very low. The optical reading device thus is in an idle state during most of the operating time. The thus obtained power savings are sensible, and the operation is autonomous for a much longer period of time.

According to a second alternative embodiment, which can be combined with the first one, each operator 3 has at least two reading devices. At each point of time, one device is operative, and the other (or others) is (or are) being quick-loaded in a socket, of a conventional type, known per se. This alternative embodiment is particularly interesting if real time links exist with a central computer system. Namely, even if the power available for the proper operation of the optical reading device lowers and reaches a value below the proper operation threshold of the electronic circuitry, the operator 3 can be warned in advance (sound and/or light signals, for instance) and may securely continue his or her filling operations of the container, with the help of the back-up optical reading device. The information regarding the unavailability of the first optical reading device is transmitted to the central computer system. Knowing the instantaneous status of the contents in the container (which items and which quantity of such were loaded), and in particular the status reached at the point of time of changing the optical reading device, the central system consequently can transmit to the back-up optical reading device a series of instructions and initialization data which allow the container filling operation to continue without any risk of error (too small or too large a number of items, as compared to the order to be met).

If no real time link exists with the central system, the operator 3 needs either to be advised early enough of the shutdown of the operational optical reading device so he or she can exchange it once the parcel being put together is terminated and before another one is started, or to manually reprogram the new optical reading device so as to take into account the items already placed into the container.

According to another alternative embodiment still, the battery exchange will be of the rapid type, and be possible during the course of an operation, without any data altering.

According to still another alternative embodiment (not shown), the display member of the optical reading device is made removable.

Such a display member, usually of the liquid crystal type, and the associated control circuitry consume very little electrical power. It can be supplied by a solar cell capturing the ambient light and converting it into electric power.

The operator 3 consequently can carry this display member with him or her along the paths which he or she follows within the preparation areas. If this display member is provided with electromagnetic signal reception circuitry, it will stay permanently linked with the optical reading device housing. The link advantageously, although not necessarily, is unidirectional, i.e. from the housing to the display member. The communication circuitry inside the display member consequently can be very simple and only include reception circuitry as was supposed herein above.

The main housing may be maintained in the idle state, or even be turned off while the operator 3 is moving, which increases the operating autonomy. If a permanent link is needed, only a minimum of the circuitry is kept operational: the communication circuitry and the local information processing circuitry for instance. The optical scanning circuitry is not power supplied.

In this embodiment, the display member can be permanently carried by the operator. Care should then be taken to only include, inside the auxiliary housing made up of the display member, the minimum circuitry needed for its proper operation, in order to minimize its electric power consumption and to optimally miniaturize it and reduce its weight, for ergonomic reasons.

The operator 3 can carry the display member in his or her hand or, preferably around his or her wrist or forearm. For this purpose, this display member is provided with a band or similar means. A particularly advantageous alternative embodiment consists of providing this display member as a duplicate of the screen 52, which will stay affixed on the reader, with the latter being provided with electronic circuitry insuring that any information appearing on the affixed screen will be duplicated on the removable screen.

Referring to FIGS. 6a to 6c, three types of storage sectors, among the most frequent ones, will now be described: sector or station with pallets, sector or station with cases for static picking, sector or station with cases for dynamic back picking. The elements common to FIGS. 6a to 6c are designated by the same references and will be described again only as needed. Furthermore, and as already indicated, the installation also may include mixed sectors, associating front storage with back storage equipment, of the dynamic picking, static picking, or pallets types.

The FIG. 6a illustrates an examplary sector or station, of the pallet type 7. Both paths of the conveyor 2 were represented, with the main path 20 defined by the motored rollers 200 (or an equivalent conveyor belt) carrying a container 4' for an order to be fulfilled, and the auxiliary path 21 which (in the described example) consists of free rollers 210. A parcel 4, in the process of being filled, is placed on these rollers 210. The reading device 5, in the position wherein it temporarily is hooked on the wall 40 and operates in a hand-free reading mode, as well as an operator loading ordered items available in the sector, also are represented.

In this sector, the items 6 are disposed on pallets 7, either directly (for instance for large size items), or contained in the bins, cardboards or any other packing. In front of each pallet 7, a label 70 referencing the products arranged therein and/or indicating their addresses (localization) in clear or with the help of bar codes, may be placed. In the latter case, the operator 3 performs an initial reading in the gun reading mode and can display in clear on the screen 52 (FIGS. 3a to 4) the references and location of items within his or her sector. The interest of this sector type lies in the possibility of bringing the items into the storage area on pallets, with motored engines, without any unloading being needed. The empty pallets are removed from the storage area, using the same way.

According to a non-represented alternative embodiment, all or part of the items within the sector may be directly deposited on the ground, in particular for large size items.

The FIG. 6b illustrates an example of a sector or station with food cases for static picking 8. The definition of such cases conventionally implies a set of vertical poles 80 bearing horizontal shelves 81. The various items are placed therein, either directly or in cardboxes or other packings. Suppose in the described example that there are three distinct items referenced 6A to 6C. As previously, labels 810A to 810C, bearing in writing the references of the items available therein and possibly address information in clear or under a coded form, can be frontally placed on the shelves. In this type of sector or station with cases, the presence of a removable screen replacing the affixed screen or being its duplicate and displaying the same information will be very useful for the operator to remind him or her the indications he or she needs for executing the operations to be performed during his or her movements.

The FIG. 6c illustrates an example of a sector or station with dynamic back picking cases 9. As previously, those cases 9 comprise an infrastructure with vertical poles 90. These however support slightly slanting planes 91, which are provided with free rollers or similar members 911. The items are placed on these rollers 911, either directly or in cardboxes or similar packing. Since the planes 91 are slanting towards the operator 3, the items 6 will, under the action of weight, move towards the front of the cases 9 as they are extracted to be loaded into a container 4 being filled to meet an order.

It is clear that this type of structure is very interesting since the operator 3 does not need to move along the shelves, since the products 6 are brought within hand reach, on one or several levels depending upon the case, with each level being generally attributed to a distinct item reference.

As previously, the labels 910, on which the previously mentioned references and possibly address information were written in clear or under a coded form are disposed frontally of the slanted plane 91.

The FIG. 7 schematically illustrates an example of a complete computerized management system adapted for all functions and tasks needed for order preparation, and implementing optical reading devices according to the invention.

The computerized system includes a central computer, designated by the general reference CPU, the initials of central processing unit. The choice of the type of computer in particular depends upon the number of orders being processed and the number of operations to be performed within a given period of time (flow of cardboxes, and so on). It may consist of a simple microcomputer for small installations, or of a net server, of a mini-computer or a more powerful computer, of the so-called main frame type. The tasks related to order preparation, which are specific to the invention, may in fact only constitute a part of the activity of the computerized system. The latter in particular may exert general tasks such as accounting and management of the enterprise, and the specific and general computerized applications can be interconnected.

The central computer CPU is linked with the various bar code reading devices, of which only four, 5a to 5d, were shown on FIG. 7, by any appropriate link, represented by a two-wire link referenced as bus, for instance of a serial type.

It should be well understood that other types of links are perfectly possible. Such normally can be radio links, for instance links according to the IEEE 803.11 standard, using so called Frequency Hopping Spread Spectrum (FHSS) algorithms or fixed frequencies, so called "Direct Sequence Spread Spectrum" (or DSSS). According to a world-wide agreement (reference ETS 300 328 for the European Union), the frequency range reserved for this use extend from 2446,6 MHz to 2483,5 MHz. Such links are compatible with local area networks, such as the "Ethernet" (registered trademark) type local area networks. Specific boards are commercially proposed and constitute an entrance point to the net.

The links also can be optical means (by infrared beam), with specific boards again being commercially available, or magnetic loop links. The location of the central computer CPU may also be remote, even very remote from the goods storage warehouse. A modem, or a so-called Intranet type web, possibly being connected in its turn with the "Internet" web can be used. Finally, several of these techniques could be used. As an example, for a remote central computer CPU, the reading devices 5a to 5d may be linked with a local micro-computer (not shown) via a two-wire, or radio, or optical link, and the local micro-computer may in its turn be connected to the central computer CPU by modem.

The shifting members 210, on the conveyor 2 (FIG. 2) also may be monitored by the central computer CPU, directly or via a local automated system, which allows the CPU to know in real time the position of all parcels 4 being prepared and the progression status of the orders being processed. For this purpose, fixed bar codes readers, of which only four 2100a to 2100d were represented, are associated with those shifting members 210. Those readers consequently also are linked with the central computer CPU by a two-wire bus or similar link. The decoding of the information born by a particular container 4 selectively triggers the shifting member of a sector if, and only if, items located in the sector served by this particular shifting member should be loaded into the container.

This operation may be under direct control of the fixed contents readers 2100a to 2100d. They then need to read and decode the information regarding the item references for this order. If at least one of the references relates to an item within the sector, the shifting member is actuated.

The shifting member may also be controlled in a centralized manner. The central computer CPU then only needs to know the number of the container or its identity. This information is compared with a reference or a purchase order. Since the central computer CPU holds, in its memory, the composition of the order and the topology of the items storage, sector by sector, it controls the actuation of the adequate shifting member or members 210, when the passing of the container 4, bearing an identifier corresponding to the purchase order, is detected.

To summarize, the central computer CPU is typically entrusted with the following tasks among those which are specific to the invention: centralized order management, item picking management, putting together parcels, editing labels with parcels identification bar codes, parcels location management, monitoring the inventory status and the replenishment of the various storage areas (sectors and cases), in particular depending upon the provisional order status and upon the gradual item removal from the shelves or pallets. The central computer also may control the shifting members, transmit the data to the reading devices 5a to 5d according to the invention, and receive data from these same readers and from the readers 2100a to 2100d.

The bar code reading devices 5a to 5d will process, a priori locally, the order preparation management for the various sectors. They typically store in their own memories all or part of the following data bases: data base for the location by sectors, item reference data base, data base identifying parcels being processed (container 4 on the conveyor 2). This data may be preloaded or may be output in real time by the central computer CPU and stored in the bar code reading devices 5a to 5d. The latter advantageously establish connections between the item references and their locations in the sectors, display the items, locations and quantities, by lines, after having read the contents identity, and clear lines when the items have been loaded in the containers. They finally output warning signals (characteristically sound beeps for instance), for instance when a correct or incorrect item has loaded, when a second loading of the same item series is attempted, etc.

Up to now, only the case of a highly automated system, an order preparation system with multiple branches, has been considered. The invention however is perfectly compatible with preparation systems implying more manual operations. The reading device used for this type of installation is identical to the one just described, in its various alternative embodiments; only the procedure followed is different. Reading the identity of the contents of an order (or of contents of several orders if several orders are simultaneously prepared in the same round) is performed by the operator at the beginning of the round, which causes entering into the memory the references of the items and quantities to be picked. The operator passes then from one area to the next, with the contents being like previously carried by hand, or on a motored carrier or on a conveyor.

Every time he or she passes into a new area, a picking alley for instance, the operator reads an identification area, in the gun reading mode. This reading causes a display of the locations and quantities of items to be picked, with the device holding in its memory the characteristics of the order associated with the parcel being constituted. By placing the reader on its support, the operator then causes the bar code reading device of the invention to switch into the hand free mode, like in the case of the multiple branches system. When an item is placed into the container, a decrementation of the corresponding reference by one unit is effected like previously.

In the case of several orders being simultaneously prepared, the display mode indicates the one container which the operator should place the item picked in the station into.

Upon reading the above description, it is clear that the invention does reach its objects, and it also is clear that it is not limited by the only embodiments explicitly described, in particular in relation with FIGS. 3a to 7.

It offers numerous advantages. In particular, in the multiple branch order preparation systems, the optical indicia reading and decoding device of the invention authorizes an active presence of several operators within the same sector, which minimizes the possibility of queues or of a total system blocking. It even is possible, in particular if real time monitoring by the central computerized system is implemented, that several operators within the same sector, simultaneously or sequentially, insure the filling of the same container.

For any order preparation system, whether strongly automated or manual, the reliability of the picking is increased, coming even close to the zero defect, with the operators being entirely guided and the operations actually effected being monitored. In each case, it is possible to avoid the marking off of a checklist. A productivity gain is obtained as compared to managing by lists to be marked off or by displays to be discharged. This productivity gain essentially results from the free hand reading mode during the loading of the parcel to be put together, in part due to the safety brought about by the automatic information processing and in part due to the ease felt by the operator in moving rapidly, without impediment or fatigue.

In addition, the above description offers the interest of clearly showing how an order batch preparation installation implements an information reading and processing device according to the invention, in the case where the information to be processed partly is collected from coded indicia optically appearing under the shape of so called bar codes.

It is clear that said device includes a portable optical reader alternately operating for reading and decoding bar codes pertinent to at least two different information series respectively pertinent to the container and the contents, information processing means for processing said contents information series depending upon information from said container information series previously collected by reading corresponding bar codes, switching means to switch each said reader from a first reading mode in which it operates for reading and processing bar codes pertinent to container information to a second reading mode in which it operates for reading and processing bar codes pertinent to contents information, and automatic means for controlling said switching means depending upon whether or not said reader is affixed on its associated support.

It also is clear that said switching means are at least doubled if not tripled (for containers, contents, storage area, for instance), in the preferred embodiments of such a device applied to an order batch preparation installation by manual item picking in the storage areas, depending upon orders to be met in the respective containers. These elements in particular were describes as including a first switch triggering a first reading mode wherein said reader is portable and operative for reading and decoding a first optical indicia series associated with contents information, a second switch triggering a second reading mode in which said reader is operative for reading and decoding a second plurality of optical indicia, associated with contents information and/or a third switch triggering a third reading mode for information of storage areas or locations, with the second switch preferably being automatically operated as soon as the portable reader is affixed in its temporary fixation state, on the support reserved for it.

It is clear that the invention thus allows avoiding all inconveniences of previously known order batch preparation installations and that it further avoids all damageable consequences which would result from solutions relying on bar code readers with a radio frequency transmission that would not allow the above described operation in an hand-free mode, or the changing of reading mode without depressing the keyboard keys. Inasmuch as a software solution would exist to avoid depressing particular keys on the reader keyboard in this case, it would impose special characters on the contents label or would not guarantee the reliability in reading mode switching, in case of a deficiency in reading the label during the first scanning which performs the task of reading codes pertinent to contents related information.

It should further be emphasized that the invention, as described in its preferred embodiments, allows avoiding the physiological impediments of the type which would be implied by bar code readers, the operation of which would depend upon a position they would occupy on the operator's body, supposing for instance that they would include a part, located on the operator finger, acting as a reader for forced reading and a part to be born on the forearm and constituting a keyboard and screen, both parts being linked by a radio frequency transmission.

Within the frame of the invention, it becomes possible to jointly change reading mode and switch the reading nature, by switching from one mode to the other, for what was illustrated as an alternate gun and hand-free operation, respectively for reading bar codes pertinent to container information and for collecting contents information by reading corresponding bar codes. At each filling sequence for a particular container, the hand-free operating mode allows the operator not to suffer from any physiologic impediment, nor even from a simple fatigue, during his or her movement between the various operating steps with the gun reader being hand-held.

What is claimed is:

1. Installation designed for putting together order batches, each batch including at least one item to be placed into a container from a storage area, said installation comprising at least one portable optical reading device having a first reading mode and a second reading mode, comprising:

at least one member for reading and decoding optical indicia;

a housing constituting a main body, and a gripping member consisting of a crosshead operable to be hand held by an operator;

a device consisting of or close to said container for obtaining a temporary fixation state of said optical device on a support;

a first switch protrusively housed in said crosshead for activating an electronic circuitry arranged inside housing to trigger said first reading mode for reading a first optical indicia series associated with said container; and a second switch arranged on said main body for activating said electronic circuitry to trigger said second reading mode for reading a second optical indica series associated with said item when said optical device is in said temporary fixation state, wherein said item is passed in front of said member for reading and decoding optical indicia, and introduced into said container.

2. Installation according to claim 1, wherein said portable optical reading device further comprises a viewing member for displaying information obtained from reading and decoding said first optical indicia series associated with said container in said first reading mode, and for displaying information obtained from said second optical indica series associated with said item passed in front of said member for reading and decoding; and wherein said viewing member is controlled by said electronic circuitry.

3. Installation according to claim 2, wherein said viewing member is removable and portable by said operator.

* * * * *